May 25, 1954     B. D. BURNS     2,679,189
AUTOMATIC FOCUSING PHOTOGRAPH PRINTER
Filed Sept. 29, 1950

INVENTOR.
BERYL D. BURNS
BY Edw. T. Newton
ATTORNEY

Patented May 25, 1954

2,679,189

UNITED STATES PATENT OFFICE 2,679,189

AUTOMATIC FOCUSING PHOTOGRAPH PRINTER

Beryl D. Burns, East Point, Ga.

Application September 29, 1950, Serial No. 187,560

4 Claims. (Cl. 88—24)

This invention relates to an automatic focusing photographic printer, and more particularly to equipment for automatically focusing an image upon sensitized paper.

In the past, photographic enlargers have been produced which project an enlarged image of a negative upon sensitized paper; but, in order to obtain a fine focus for a given size image, these enlargers require the adjustment of two variables; first, the distance between enlarger and printing surface must be adjusted, and, secondly, the focus of the lens must be adjusted. With different size negatives, the enlarger must be re-adjusted for each size, if prints of uniform size are desired.

Recently the practice of substituting lenses of different focal length has obviated the necessity of making fine adjustments for standard size negatives; however, this is a time consuming process which has not proved to be satisfactory. Also, the use of a mechanical link between the height adjustment and the lens has reduced the operation of obtaining a given size image to but one operation.

Accordingly, it is an object of this invention to provide a photographic enlarger which will automatically focus to produce a uniform size image, regardless of the size negative used.

It is a further object of the invention to provide an enlarger which may be selectively, either adjusted for size by hand with but one operation or automatically adjusted through electronic means.

Another object of the invention is to provide a commercial enlarger which will reduce the time required to process a large quantity of photographic prints.

Further objects and advantages of my invention will be apparent from the following description when taken in conjunction with the accompanying drawing wherein like characters of reference designate corresponding parts throughout the several views, and wherein.

Figure 1:
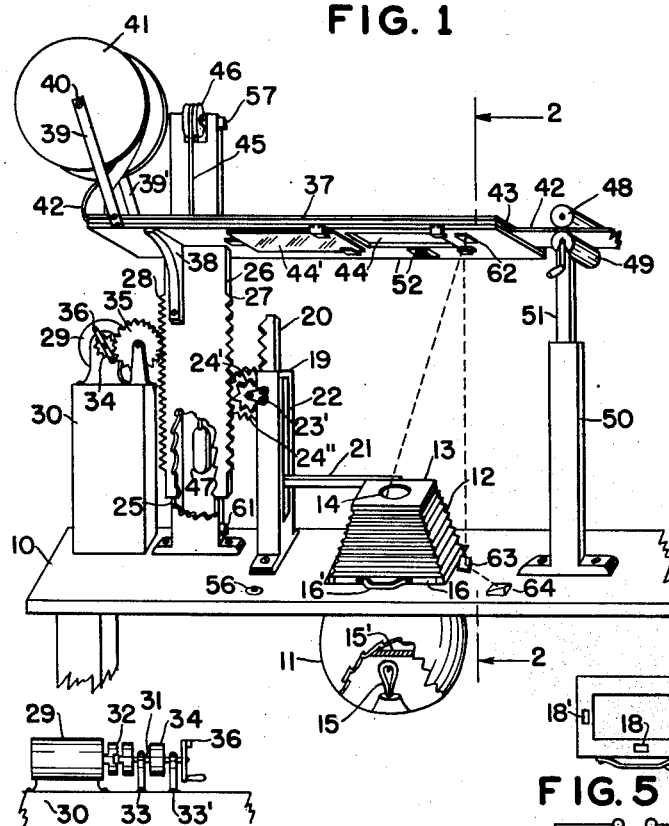
Fig. 1 is a partially broken perspective view of an enlarger constructed in accordance with my invention.
Figure 2:
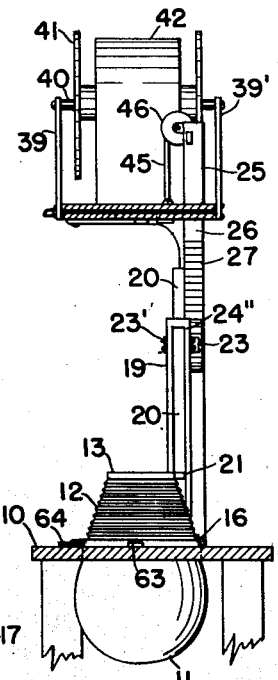
Fig. 2 is a cross-sectional view taken along line 2—2 of Fig. 1.

Referring to the embodiment chosen for illustration, numeral 10 denotes generally a table which supports the photographic enlarger equipment. Extending through a centrally located aperture provided in table 10 is a photographic enlarger which comprises light housing 11, bellows 12, lens board 13, and lens 14, all arranged in the conventional manner. Numeral 15 in Figs. 1 and 4 denotes a light source which is installed in light housing 11 in the conventional way. A light diffuser (not shown) is also provided in its conventional position in light housing 11.

Figures 3, 4, 5:
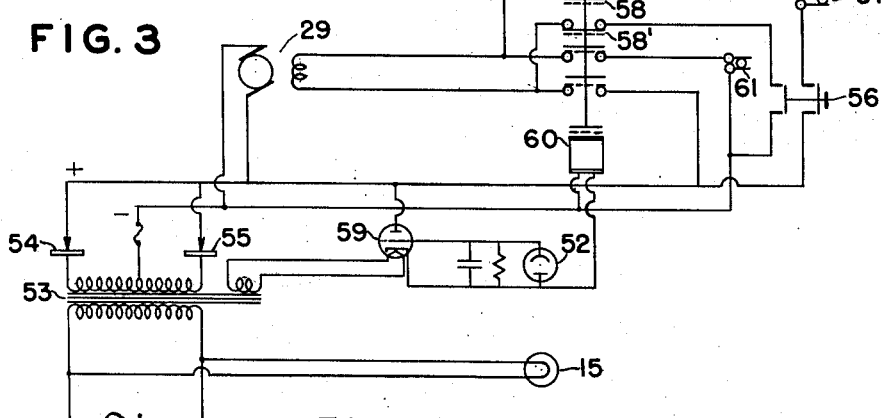
Fig. 3 is a view of a detail.
Fig. 4 is an electrical diagram of the circuit used in my invention.
Fig. 5 is a view of a detail.

As seen in Fig. 1, a negative carrier 16 is slidably positioned in conventional manner between light housing 11 and bellows 12, and is provided with a handle 16' to aid in sliding it in and out of position. Negative carrier 16 retains negative 17; and, in addition, is provided with transverse apertures 18 and 18' placed adjacent respective edges of negative 17, as shown in Fig. 5, when it is held in the carrier. Therefore, when the negative image is projected, beams of light are always projected at positions adjacent the respective outside edges, the function of which will be described later. It will be understood that the negative carrier 16 is so arranged and constructed that light from the light source 15 can shine only through the negative placed in the carrier and through the apertures 18, 18', and that negative carriers having central openings of different sizes to accommodate negatives of different sizes, the borders of the negative carrier around the negative being narrowed or widened to provide the central opening of a size to fit the particular negative and center it in the holder. In all cases, the apertures 18, 18' are placed along the edges of the central aperture adjacent the negative so as to be always the same distance from the edge of the negative, all for the purpose to be described hereinafter.

As seen in Fig. 1, an upstanding rack supporting member 19 is mounted on table 10 adjacent bellows 12 and slidably retains vertical lens rack 20 therein. Member 19 may be formed as a tube of rectangular cross-section which contains flanged portions at its bottom section so that it may be attached by screws to table 10. Rack 20 is formed of elongated rectangular material with a cross-sectional area slightly smaller than the inside cross-sectional area of member 19 for sliding movement therein. Extending at right angles from the lower end of rack 20 and parallel to table 10 is arm 21 which is fixed to the rear side of lens board 12 to form a rigid link between lens board 13 and rack 20. Slot 22 is provided in the side of member 19 adjacent lens board 13 and provides an opening so that arm 21 may slide away from or toward table 10, thus actuating lens board 13 to move lens 14 away from or toward the negative carrier.

Journaled on a horizontal shaft mounted between brackets 23 and 23' fixed substantially on the upper portion of member 19 and adjacent the side opposite the slot 22 are a pair of integral gears 24', 24". The smaller gear 24' extends through a rectangular slot in member 19 and meshes with rack 20, and the larger gear 24" is positioned adjacent bracket 23 so that its periphery is outwardly adjacent the side of member 19 which supports bracket 23.

A second substantially longer upstanding tube 25 of rectangular cross section is mounted on table 10, adjacent member 19. An elongated sleeve 26, which is approximately half the length of tube 25 is slidably positioned on tube 25 and contains racks 27 and 28, longitudinally fixed along opposite sides of sleeve 26 so that rack 27 meshes with the protruding teeth of the larger gear 24".

A reversible motor 29 is mounted on block 30, positioned adjacent tube 25 so that the shaft of motor 29 is on a plane which passes substantially midway of the height of tube 25. As illustrated in Fig. 3, the shaft of motor 29 is connected to shaft 31 through clutch 32. Shaft 31 is journaled on spaced brackets 33 and 33' on block 30, so that with axial motion of the shaft, clutch 32 may be engaged or disengaged. A wide cog-wheel 34 is fixed on shaft 31 between brackets 33 and 33' and engages idler gear 35 which is journaled on a separate horizontal shaft and supported by brackets from block 30 adjacent cog-wheel 34, so that regardless of whether clutch 32 is engaged or disengaged, cog-wheel 34 and idler gear 35 will mesh. A crank handle 36 is provided on the free end of shaft 31 so that when clutch 32 is disengaged, cog-wheel 34 may be rotated by this handle, and when clutch 32 is engaged, the handle will rotate but will not interfere with the operation of motor 29. As seen in Fig. 1, idler gear 35 engages rack 28 so that upon actuation of cog-wheel 34 either by motor 29 or by handle 36, sleeve 26 will be actuated to slide up and down tube 25.

A flat projection board 37, which contains a rectangular opening on the flat surface adjacent one corner thereof to allow tube 25 to extend therethrough, is mounted on the top end of sleeve 26 parallel to table 10 and is supported on bracket 38 mounted on that sleeve.

A pair of braces 39 and 39' extend upwardly from the corners of projection board 37 adjacent tube 25 to provide support for a horizontal shaft 40 fixed between the respective free ends thereof. A drum or roll 41 of sensitized paper 42 is journaled on shaft 40 so that the free end of the paper 42 may be fed through a narrow rectangular slot 43 which is provided in projection board 37 and which runs the length of the projection board parallel with the flat surfaces so that the sensitized paper may extend therethrough.

On the lower side of projection board 37, and at a position immediately above lens 14, a rectangular opening 44 is provided which communicates with the slot 43. Opening 44 allows light from the enlarger to be projected on the sensitized paper within slot 39 which is exposed by the opening. A ruby lens or glass 44' is slidably positioned at opening 44 so that the sensitized paper may be exposed when desired.

A flexible cable 45 is connected to the upper side of projection board 37 at a point adjacent tube 25 and extends over roller 46 rotatably mounted on the upper end of tube 25 and extends into the hollow section of the tube. Weight 47 is attached to the end of cable 45 in tube 25 and provides a counterbalance.

Any suitable means may be used for drawing the sensitized paper 42 through slot 43 and measuring the paper so that unexposed increments of the paper may be continually positioned at opening 44. As seen in Fig. 1, I have provided opposed parallel rollers 48 and 49, whose respective circumferences are slightly greater than the length of opening 44, in a position adjacent the end on projection board 37 and in a position to receive the free end of paper 42. When rollers 48 and 49 are rotated one revolution, the sensitized paper 42 is advanced a distance greater than the length of opening 44 and therefore on each revolution will position an unexposed section of paper at opening 44.

A support may be positioned below rollers 48 and 49 as shown in Fig. 1 and may consist of a hollow upstanding tube 50 of rectangular cross-section which has flanged sections on its lower end so that it may be retained on table 10 by screws. Tube 50 slidably journals an elongated member 51 of rectangular cross-section which is connected to projection board 37 at a point adjacent rollers 48 and 49. Tube 50 and member 51 provide lateral stability for the projection board 37 and connecting assembly but do not support the weight and therefore member 51 is free to slide in tube 50.

It is to be remembered that the weight of projection board 37 and drum 41 are centered at bracket 38 so that the substantial part of the weight is carried by tube 25 through the support of roller 46.

A novel part of my invention is the positioning of a photoelectric cell or electric eye 52 at a point adjacent opening 44 to actuate motor 29. Fig. 4 shows the electrical connection between cell 52 and motor 29 and therefore the wiring is not shown in the preceding figures. Referring to Fig. 4, I have provided a transformer 53 which is connected to an alternating current supply when the printer is to be operated. Through rectifiers 54 and 55, full wave rectification is obtained to actuate motor 29 when desired.

Assume now that a negative 17 has been inserted in the negative carrier 16 on the enlarger and current is supplied to the wires leading to transformer 53. Light 15 in the light housing 11 is projected against opening 44. A thumb switch 56 may then be held closed to supply current to the field of motor 29 through upper limiting switch 57 which is resiliently held closed, and through poles 58 and 58' which are also normally held in the closed position by spring action. Motor 29 then operates to raise projection board 37 and at the same time lowers lens board 13 to keep the projected image always in focus. As projection board 37 moves away from table 10 the image projected thereon becomes larger until light projected through aperture 18 strikes photoelectric cell 52. When the light strikes photoelectric cell 52, current is allowed to flow through amplifier tube 59 to actuate spring loaded relay 60 which functions, as shown by broken lines in Fig. 4, to break the current supplied by thumb switch 56 and reverse motor 29 by reversing its field. Thumb switch 56 may be released at any time after relay 60 is first actuated. If it is held down, projection board 37 will oscillate or hunt as relay 60 selectively supplies current reversing the field or supplies current normally. If thumb switch 56 is released at any time after relay 60 has first been actuated, the projection board will position itself at a point where the light from aperture 18 is adjacent but not shining on photoelectric cell 52. In other words, light from aperture 18 is directed away from the photoelectric cell 52. In this manner, once the proper size of the image is attained, the motor is deactivated until switch 58 is again closed or light is again directed on photoelectric cell 58.

If another size negative is used, thumb switch 56 should be reactivated and the operation repeated, because the apertures 18, 18' will be spaced different distances from the center of the negative for different size negatives, and the apparatus will have to be readjusted to cause the light to shine through the aperture 18 onto the photoelectric cell 52 to set in motion the above described operation to properly focus the image on the film. It will be apparent to those skilled in the art that the operation of merely pressing a thumb switch to obtain a correct size image is a great improvement and will increase the speed of exposing sensitized paper.

Of course, after the image is properly positioned at opening 44, the ruby lens, protecting the sensitized paper positioned therebehind, may be removed to expose the paper.

It should be understood that many variations in the electrical circuit shown in Fig. 4 are possible without departing from the scope of my invention. For example, a polarized reverse current normally closed relay could be placed in series with the motor field circuit to automatically break the circuit when the current is first reversed.

Upper limiting switch 57, and lower limiting switch 61 located on tube 25, are installed in the electrical circuit to stop the flow of current to the field of motor 29 at the respective upper or lower limits of rack 27 for obvious reasons.

As seen in Fig. 1, I have provided mirrors 62, 63 and 64 so that the operator, by manual operation of handle 36 with clutch 32 disengaged, may properly adjust the size of the image if the electrical circuit fails to function. When light is projected on mirror 62 it is reflected to mirror 63 and then to mirror 64. Mirror 62 is located adjacent one edge of opening 44 and reflects light in a vertical line down to mirror 63 and therefore, regardless of the height of projection board 37, mirror 62 may be seen through mirror 64. It is obvious that the same adjustments for the size of the image may be made by hand as were performed by the electrical circuit. The operator may adjust the height of projection board 37 so that light from aperture 18' appears in mirror 64; then, the print may be exposed.

Therefore, large quantities of prints may quickly and easily be made with little effort on the part of the operator. It should be apparent from the foregoing description that when projection board 37 is moved toward table 10, lens board 13, because of the mechanical link between rack 20 and rack 27, is simultaneously moved away from table 10 and away from the negative carrier. Since the larger gear 24" is meshed with rack 23, the movement of projection board 37 is more pronounced than that of the lens board 13 and therefore always maintains the image in focus at opening 44. It should be remembered, however, that the mechanical focusing hereinbefore described is not an exact focus and therefore lens 14 must have a sufficiently small aperture to provide a proper focal depth to eliminate the mechanical errors of focusing and to give a clear image throughout the travel of projection board 37.

It will be obvious to those skilled in the art that various modifications and changes may be made in the device shown and described without departing from the scope of my invention as defined in the appended claims.

I claim:

1. Apparatus of the class described wherein light is directed from a light source via a negative carrier and lens to project an image upon photo-sensitized material on a projection board, said projection board, lens, and negative carrier being movable with respect to each other, the combination of a photoelectric cell carried by said projection board, motor power means and automatic focus means for varying the distance between said projection board and said lens and between said lens and said negative carrier to increase the size of said image on said projection board, light from said negative carrier passing through the lens to said photoelectric cell when said image reaches a predetermined size on said projection board, said motive power means being responsive to said photoelectric cell to reduce the size of said image when said beam of light from said carrier is shining on said photoelectric cell, said motive power means being rendered inoperative when the said image on said projection board is so narrowed as not to illuminate said photoelectric cell whereas said image is projected upon said photo-sensitized material in a preselected size.

2. Apparatus of the class described comprising a light source, a projection board with means for positioning photo-sensitized material thereon, a lens positioned between said light source and said projection board, a negative carrier for positioning a negative between said light source and said lens for projecting an image of said negative upon said photo-sensitized material on said projection board, a photoelectric cell carried by said projection board, motor power means and automatic focus means for varying the distance between said projection board and said lens and between said lens and said negative carrier to increase the size of said image on said projection board, said negative carrier being provided with a means for directing a beam of light from said light source onto said photoelectric cell when said image reaches a predetermined size on said projection board, said motive power means being responsive to said photoelectric cell to reduce the size of said image when said beam of light from said light source is shining on said photoelectric cell, said motive power means being rendered inoperative when the image on said projection board is so narrowed as not to illuminate said photoelectric cell whereat said image is projected upon said photo-sensitized material in a preselected size.

3. Apparatus of the class described comprising a light source, a projection board with means for positioning photo-sensitized material thereon, a lens positioned between said light source and said projection board, a negative carrier for positioning a negative between said light source and said lens for projecting an image of said negative upon said photo-sensitized material on said projection board, a photo-electric cell carried by said projection board, motor power means and automatic focus means for varying the distance between said projection board and said lens and between said lens and said negative carrier, manual switch means operable to operate said motor power means to increase the size of said image on said projection board, said negative carrier being provided with an aperture for directing a beam of light from said light source onto said photoelectric cell when said image reaches a predetermined size on said projection board, said motive power means being responsive to said photoelectric cell to reduce the size of said image when said beam of light from said light source is shining on said photoelectric cell, said motive power means being rendered inoperative when said beam of light on said projection board is so narrowed as not to illuminate said photoelectric cell whereat said image is projected upon said photo-sensitized material in a preselected size.

4. Apparatus of the class described comprising a light source, a movably mounted projection board with means for positioning photo-sensitized material thereon, a lens positioned between said light source and said projection board, a negative carrier for positioning a negative between said light source and said lens for projecting an image of said negative upon photo-sensitized material on said projection board, motor power means and automatic focus means to move said projection board and said lens to increase the size of said image, and a photoelectric cell carried by said projection board, said negative carrier being provided with an aperture for directing a beam of light from said light source onto said photoelectric cell when said image reaches a predetermined size, said motive power means being responsive to said photoelectric cell to reduce the size of said image while said beam of light from said light source is shining on said photoelectric cell, said motive power means being rendered inoperative when said beam of light on the projection board is so narrowed as not to illuminate the photoelectric cell.

References Cited in the file of this patent

UNITED STATES PATENTS

| Number | Name | Date |
|---|---|---|
| 2,134,757 | Goldsmith | Nov. 1, 1938 |
| 2,563,892 | Waller | Aug. 14, 1951 |